No. 765,676. Patented July 26, 1904.

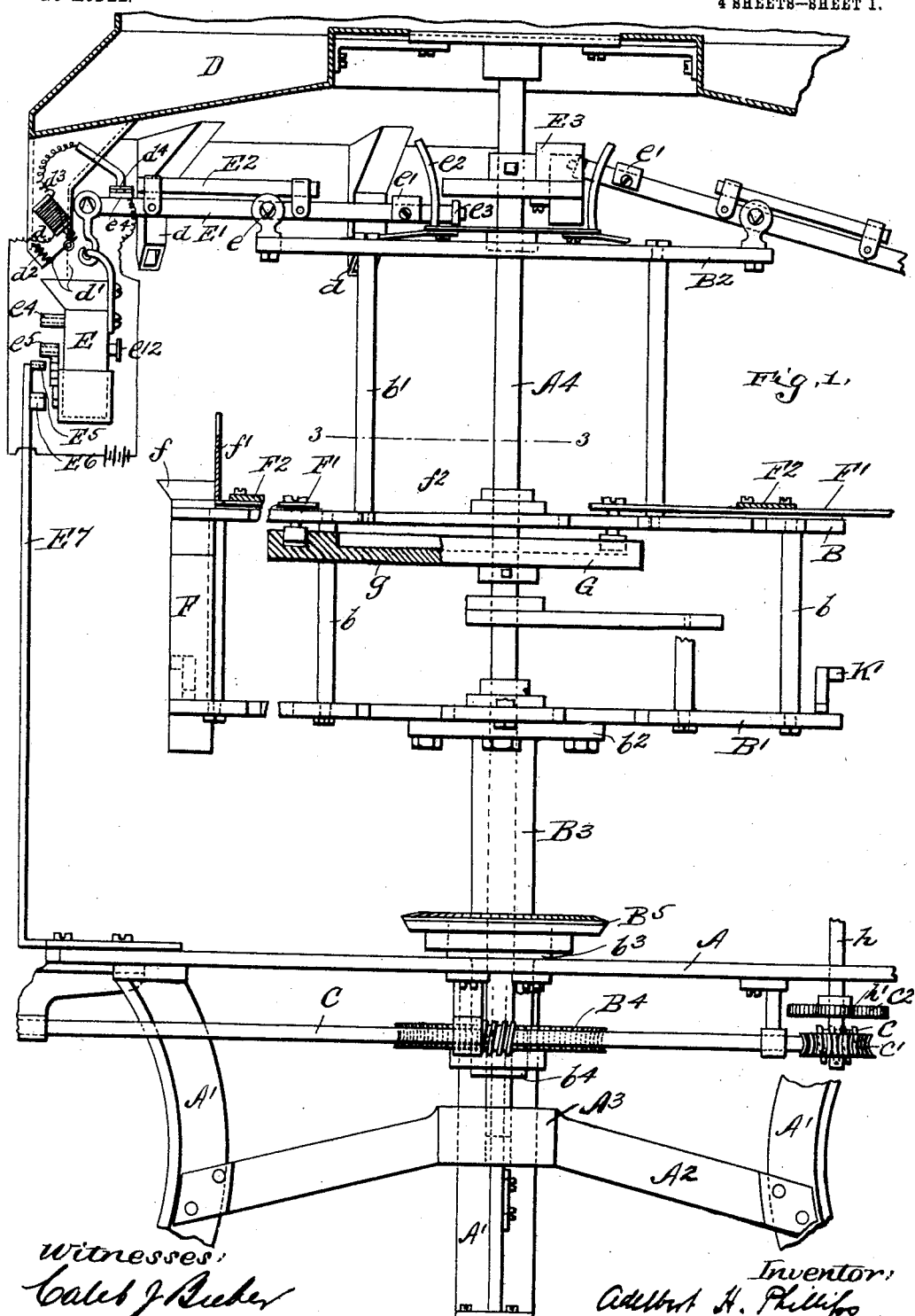

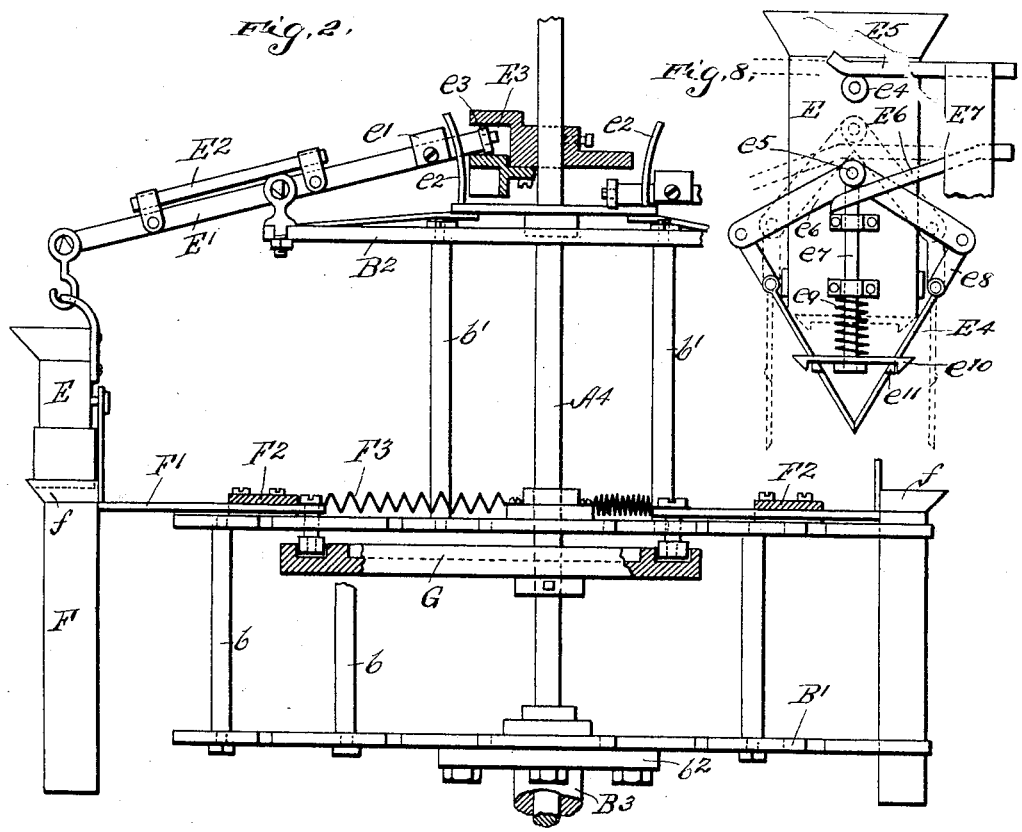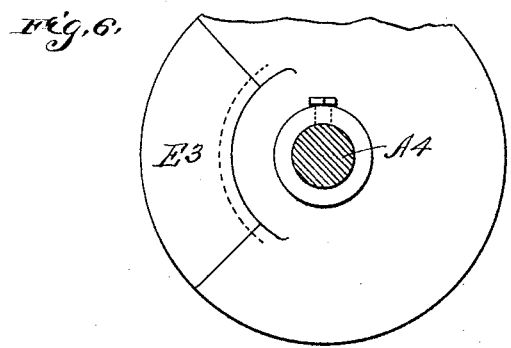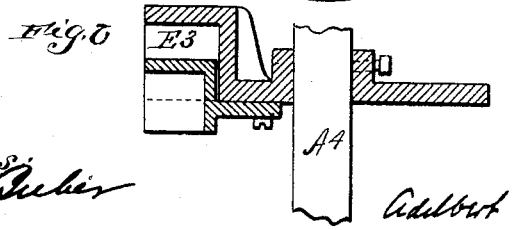

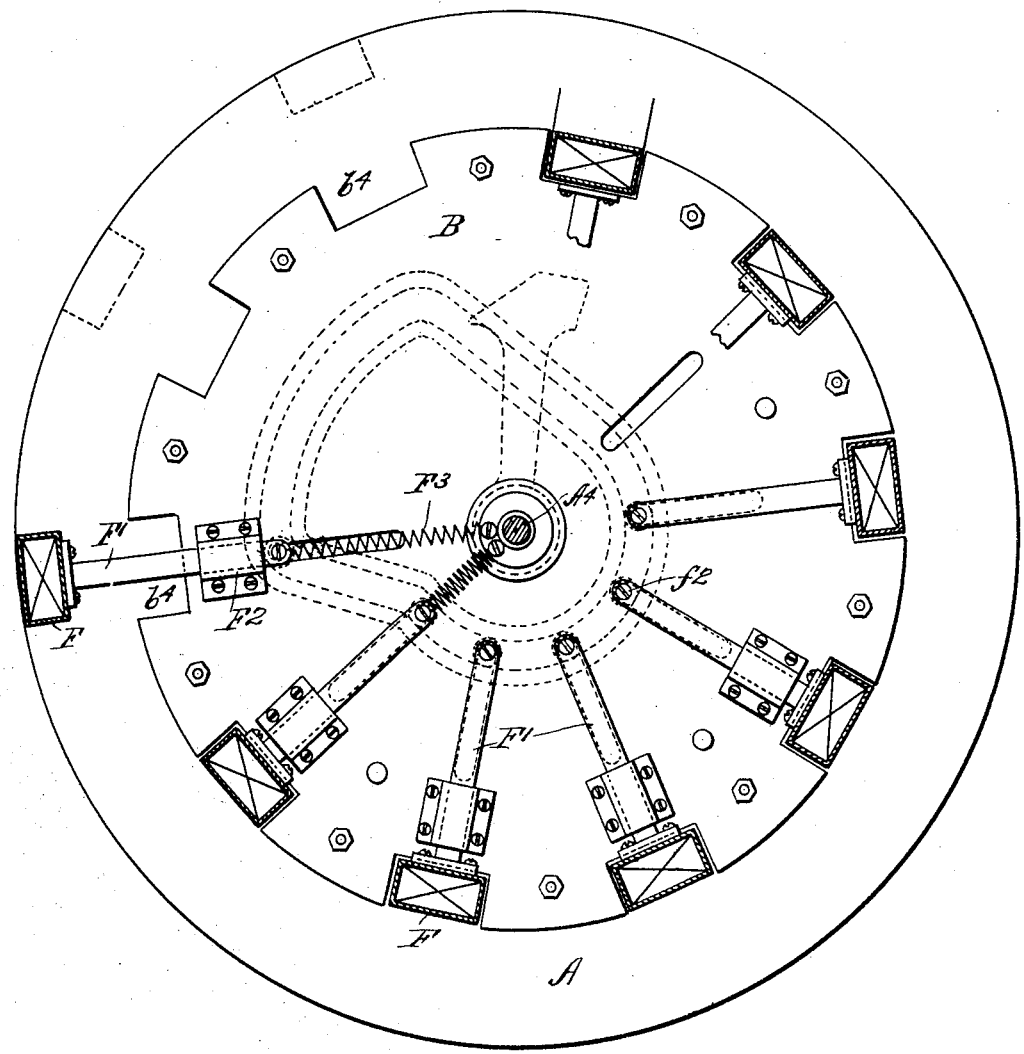

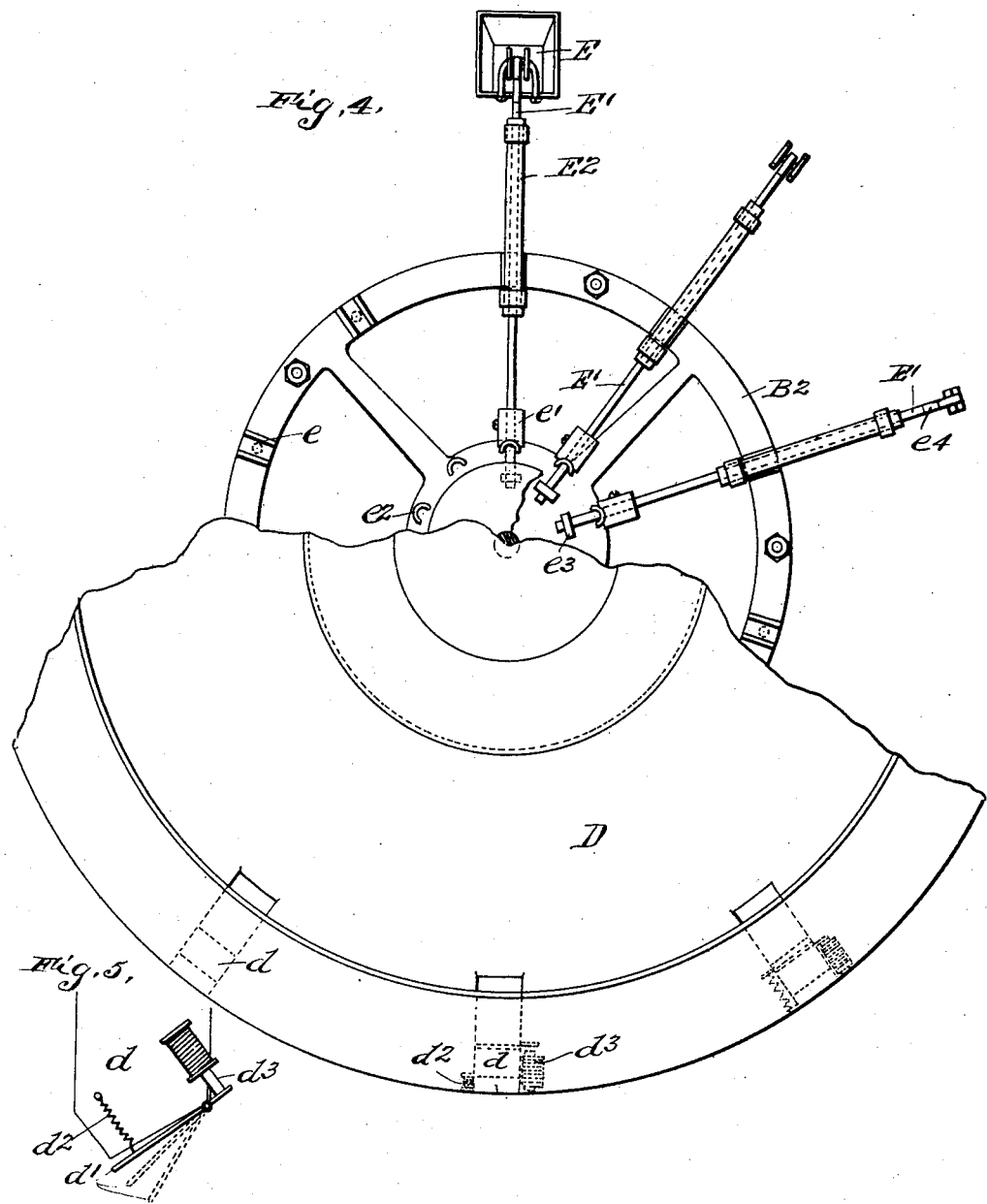

UNITED STATES PATENT OFFICE.

ADELBERT H. PHILLIPS, OF PHILADELPHIA, PENNSYLVANIA, ASSIGNOR, BY MESNE ASSIGNMENTS, TO AUTOMATIC PACKING AND WEIGHING MACHINE COMPANY, A CORPORATION OF DELAWARE.

AUTOMATIC WEIGHING MECHANISM.

SPECIFICATION forming part of Letters Patent No. 765,676, dated July 26, 1904.

Original application filed December 2, 1899, Serial No. 738,976. Divided and this application filed May 7, 1901. Serial No. 59,177.

(No model.)

*To all whom it may concern:*

Be it known that I, ADELBERT H. PHILLIPS, a citizen of the United States of America, and a resident of the city and county of Philadelphia and State of Pennsylvania, have invented certain new and useful Improvements in Automatic Weighing Mechanism, of which the following is a specification.

My present invention relates to improved automatic weighing mechanism adapted particularly for use in connection with an automatic packaging-machine, such as is shown in my pending application for Letters Patent filed December 2, 1899, Serial No. 738,976, and it embraces features shown in said pending application, but not claimed therein.

A main object of my invention is to provide for the employment of a continuously-revolving series of receiving and weighing vessels in connection with a fixed hopper; and the invention consists in the novel mechanism for effecting this object and in other features of construction and arrangement which are fully described in connection with the accompanying drawings and particularly pointed out in the claims.

Figure 1 is a partly sectional view of a portion of a machine embodying my improvements. In this figure the bag-forming mechanism, except that portion thereof which engages the cam hereinafter referred to, which is at the point where it is projected into position to receive the material, is removed, the forming mechanism shown as retracted being one which is approaching said position. Fig. 2 is a partial sectional elevation showing some of the parts in different position from Fig. 1. In this figure the bag-forming mechanism is projected to the place where it receives the material from the receiver or pan of the weighing mechanism. Fig. 3 is a sectional plan view on the line 3 3 of Fig. 1, showing a portion of the bag-forming mechanism which in my preferred construction coöperates with my improved weighing mechanism. Fig. 4 is a plan view showing in one part thereof a portion of the rotary weighing-table and attached scales and in another part a portion of the fixed hopper above said weighing-table. Fig. 5 is a separate enlarged view indicating the varying openings provided for the gates of the several fixed hopper-outlets. Figs. 6 and 7 are separate views of the scale-beam-operating cam, and Fig. 8 is a detail view of the weighing vessel.

A represents the bed-plate of my complete machine, which, as shown, is circular in form and supported upon legs $A'$, which are connected by arms $A^2$ with a central support $A^3$ for a fixed central column $A^4$. Upon the latter is rotatably mounted the bag-forming table, made up of a top plate B and bottom plate $B'$, connected by posts $b$, and the weighing table or ring $B^2$, which is connected with the bag-forming table by posts $b'$, these tables being carried above the bed-plate A by a sleeve $B^3$ on the column $A^4$, to the top flange $b^2$ of which sleeve the bag-forming table is secured, while the lower flange $b^3$ of the same bears upon the bed-plate A. A bottom extension $b^4$ of the sleeve passes through the bed-plate for attachment of a worm-wheel $B^4$, through which rotary movement is imparted to the sleeve and the tables carried thereby from a driving-shaft C, suitably mounted under the bed-plate.

Upon the top of the fixed central column $A^4$ is carried a fixed hopper D, adapted to receive and hold a supply of the material to be packaged, said hopper being of any preferred form so far as the main body is concerned, but being provided with a series of bottom discharge-outlets $d\ d\ d$, adapted to discharge successively into each of a circular series of receiving and weighing pans E, carried by the rotary weighing-table $B^2$, as each pan is successively swung under said series of outlets, the object being to deliver into each pan just the desired amount of material without intermitting the rotary movement of the weighing table or pans. To accomplish this, I preferably provide each outlet $d$ from the hopper with a hinged gate $d'$, which is normally held closed by a spring $d^2$, but which is so arranged as to be opened automatically by an electromagnet $d^3$ while any one of the weighing-pans is in proper position below it, and electric circuit through the magnet-coil being closed, as indicated in the drawings, by contact of a circuit-closer $e^4$ on the moving weighing-pan scale-beam E' with a fixed member $d^4$ in the circuit.

The gate of the first one or more outlets should be arranged to open considerably, as indicated by one or other of the dotted positions in Fig. 5, so as to deliver rapidly into the moving weighing-pan, the gate being closed by the spring $d^2$ before the pan has passed the outlet by the opening of the circuit through the electromagnet. Succeeding gates $d'$ are similarly opened and closed automatically as the pan passes beneath them; but the size of the opening and the flow of material is reduced, as indicated by the nearly-closed position in Fig. 5, as the pan is gradually filled until from the last outlet a mere trickle of material may be delivered into the pan to complete the amount required to depress the end of the scale-beam.

Each of the circular series of weighing-pans E is carried upon the outer end of a radially-arranged scale-beam E', which is pivoted intermediately at $e$ to a bearing on the weighing-table $B^2$. The inner end of each beam is provided with an adjustable weight $e'$ and with an end roller $e^3$ and is guided in vertical guideways $e^2$, fixed to the table $B^2$. A mercury-tube $E^2$ is also preferably provided on each scale-beam, the purpose of which is to throw the additional weight of a quantity of mercury contained in said tube toward the outer end of the beam as soon as the latter has been slightly depressed by the filling of the pan E, thus giving a more positive downward-moving tendency to said pan. In order to retain control of the vertical swing of the weighing-pan E, so that the latter may be properly operated for delivery into the package or bag, as hereinafter described, I provide a cam $E^3$ on the fixed central column $A^4$, in which each roller $e^3$ on the beam end rides and by which the vertical movement of the beam and weighing-pan is controlled, as may be required.

The continuous-bag-forming mechanism which is preferably used in connection with my continuous-weighing mechanism above described is particularly set out and claimed in my pending application referred to and forms no part of my present invention. I will therefore only refer briefly to those features thereof which coöperate directly with the said weighing mechanism. The series of bag-carrying devices are movable rotatively with the weighing mechanisms and are also moved relatively to their respective weighing mechanisms, and as herein shown and as preferably employed constitute bag-formers F F which are carried by their table B B', which revolves with the weighing-table B. Each former is automatically moved inward and outward in a radial direction during each revolution of the table, the bag-forming operations thereon being effected mainly while in retracted position and the finished bag moved outward, carried on the hollow former, at the proper time to bring it under the receiving and weighing vessel E, carried above it, before the latter has been properly filled and lowered, as previously described, so as to be ready to receive the contents thereof when discharged. While the parts E and F are revolving together in this relative position, the hinged bottom gates $E^4$ of the weighing vessel or pan E are automatically opened, as indicated, by fixed fingers $E^5$ $E^6$, carried from the bed-plate A on a standard $E^7$ and arranged in the path of the weighing vessel so as to engage a fixed projection $e^4$ on the outer face of the pan and a movable pin $e^5$ at the junction of links $e^6$ $e^6$, connecting the gate-arms $e^8$ $e^8$ with the centrally-guided rod $e^7$, carrying a locking-bar $e^{10}$, which when depressed by a spring $e^9$, adapted to normally close the gates $E^4$, engages the latter, so as to positively hold them closed until said locking-bar is raised by the passing of the projections $e^4$ $e^5$ between the fixed fingers, as indicated in dotted lines, Fig. 8, which passage also positively opens the gates, as shown, thus delivering the contents into the bag, which latter is thereby forced off from the former F, to be caught and subsequently packed and closed in any suitable manner.

It will be observed that my improved packaging-machine embraces, in conjunction with a hopper or other suitable reservoir for the material to be packed, a traveling series of groups of packaging devices, each group independent of every other group and each group comprehending a pan or receptacle which receives the material from the reservoir and when it has received its predetermined quantity of material discharges the same directly into an element which moves with it and forms part of the group and carries the package which constitutes the final receptacle of the material, as contradistinguished from a weighing or measuring mechanism wherein the several weighing or measuring elements of the structure discharge their predetermined loads into a discharge-conduit common to all the measuring or weighing elements. This constitutes one of the principal features embraced in this invention and enables the several operations of filling the packages to be performed while the elements of the groups of packaging devices are in motion.

Having thus fully described my invention, I do not desire to limit myself to the preferred construction specifically set forth; but

What I claim is—

1. In a packaging-machine, the combination of a rotating series of packaging devices and means by which the same are supplied with material to be packaged, each of said packaging devices being independent of every other packaging device and each comprising a package-carrier and a weighing mechanism rotative together, said weighing mechanism having a pan or receptacle located between said package-carrier and material-supplying means and a weighing-beam supporting the same, said pan or receptacle being constructed to retain the material until it has received its predetermined load and being movable toward the bag-carrier under the influence of said load, and means operated during said movement of said pan or receptacle to cause the same to discharge its load into said carrier.

2. In a packaging-machine, the combination of a rotating series of packaging devices and means by which the same are supplied with material to be packaged, each of said packaging devices being independent of every other packaging device and each comprising a package-carrier and a weighing mechanism rotative together, said weighing mechanism including a scale-beam and a pan or vessel supported thereby and having a normally closed outlet, and means for opening the outlets from the pans or vessels when the latter have been lowered by the action of the scale-beam toward the package-carrying devices to thereby discharge the predetermined load from said pans or vessels toward the said package-carrying devices.

3. In a packaging-machine, the combination with a relatively stationary reservoir for the material to be packaged, having means by which the material is discharged therefrom, of rotating groups of packaging devices adapted to package the material while the groups are in motion, each group being independent of every other group and each including a weighing-scale and a package-carrying device, said scale having mechanism which controls the discharge from the reservoir and a pan or vessel supported by its beam and provided with means by which its outlet is closed, and said package-carrying device rotating with said pan or vessel and so related thereto as to receive the material discharged therefrom, and means for opening the outlets from the pans or vessels when the latter have been lowered by the action of the scale-beam toward the package-carrying devices.

4. In a packaging-machine, the combination with a series of receiving vessels or pans, weighing mechanisms carrying the same, means for supporting a package beneath each of said vessels or pans and mechanism for rotating said parts together, of gated means for supplying the receiving vessels or pans with material to be packaged, means controlled by the rotative movement of the parts for opening and closing the gated supplying means, and means operable during the downward movement of said vessels or pans to cause the same to discharge into their respective package-carriers when loaded.

5. In a packaging-machine, the combination of a traveling series of receiving vessels or pans, and weighing mechanisms carrying the same, means operated to supply each of said vessels or pans with a varying quantity of material to be packaged to thereby cumulatively load the same, a package-carrier for each of said vessels or pans traveling therewith and means operated by downward movement of said pans or vessels to cause the discharge of the contents thereof toward their respective package-carrying devices.

6. In an automatic weighing-machine the combination with a continuously-moving series of weighing mechanisms each having a receiving vessel, of a fixed hopper having a series of independent outlets into communication with which said vessels are carried by the movement of said weighing mechanisms, each outlet of the series having a normally closed delivery device the series of devices having gradually-reduced delivery capacities and means controlled by the movement of said weighing mechanisms for automatically opening each of said devices in succession during the passage of each of said vessels to cumulatively load the same.

7. In a packaging-machine the combination with a continuously-moving series of weighing mechanisms each having a receiving vessel, of a fixed hopper having a plurality of independent outlets beneath which said vessels are carried by the movement of said weighing mechanisms, a plurality of gates arranged to normally close said outlets and means movable with said moving vessels, whereby each of said gates is automatically opened in succession during the passage of each of said vessels beneath it.

8. In an automatic weighing-machine, the combination with a continuously-moving series of weighing mechanisms each having a receiving vessel, of a hopper having a plurality of independent outlets each provided with a normally closed delivery device, said devices having varying discharge capacities, and beneath which said vessels are carried by the movement of said weighing mechanisms, and means whereby each of said delivery devices is automatically opened in succession during the passage of each of said vessels beneath it.

9. In a packaging-machine, the combination with a hopper having a series of independent outlets with gates therefor, of a continuously-moving series of receiving vessels, a scale-beam carrying each of said vessels, devices carried by said beams for successively opening said gates during the passage of said vessels thereunder, said beams operating to lower their respective vessels, of bag-carriers arranged below said vessels and moving therewith and each adapted to receive the material from the vessel above it.

10. In a packaging-machine, the combination of a hopper with a plurality of independent groups of packaging devices each comprising a receiving vessel, a scale-beam carrying the same, a bag-carrier arranged below said vessel and moving therewith, and adapted to receive the material from the vessel above it when said vessel is lowered by the swing of the scale-beam, and means for causing the automatic discharge of the contents of said lowered vessel into said bag-carrier.

11. In a packaging-machine, a movable receiving vessel or pan having hinged bottom gates, a scale-beam carrying the same, and a package-carrier beneath said vessel, in combination with a spring-actuated closing means for said gates having arms pivoted to said gates and extending from a common pivotal point, and a relatively fixed device projecting into the path of said pivotal point to raise the same and thereby open said gates against the action of said spring and cause the material to be discharged therefrom into the package beneath.

12. In a packaging-machine, the combination with a hopper, of a rotary series of gated receiving and measuring vessels each carried upon a radially-arranged scale-beam, vertical guides for said beams, a fixed cam arranged to engage the weighted ends of said beams to control their vertical swing, means to open said gates when in their lowered positions and package-carriers which receive the material from said vessels.

13. In a packaging-machine, the combination of a traveling series of weighing mechanisms each having a receiving vessel, and loading means for said receiving vessels having gated outlets of varying discharge capacities and means for opening said gates in succession to thereby cumulatively load each of said vessels.

14. In a packaging-machine, the combination with a hopper, of a rotary series of gated receiving vessels each carried upon a scale-beam, vertical guides for said beams, means to engage the weighted ends of said beams to control their vertical swing, a gravitating means on each beam, moving toward the vessel thereon when said vessel is partly depressed to give a more positive downward-moving tendency thereto, and means to open the gates of said vessels when the same are in their lowered positions.

15. In a packaging-machine, the combination with a hopper, of a rotary series of gated receiving vessels, a scale-beam carrying each of said vessels, vertical guides for said beams, means to engage the weighted ends of said beams to control their vertical swing, a mercury-containing tube on each beam, means to open the gates of said vessels when the same are in their lowered positions, and package-carriers beneath said vessels.

16. In a packaging-machine, the combination of rotating packaging devices and means by which the same are supplied with material to be packaged each of said packaging devices being independent of every other packaging device and each comprising a bag-former and a weighing mechanism rotative together, and means operated to cause the discharge of the weighed material into the bag on said former at the proper time.

17. In a packaging-machine, the combination of a material-supplying means, a means for receiving a predetermined quantity of material therefrom, a bag-former movable relatively to said receiving means, and mechanism operable to adjust said former into position to cause the bag thereon to receive the load from said receiver and to cause the latter to discharge its load into said bag.

18. In a packaging-machine, the combination of rotating packaging devices and means by which the same are supplied with material to be packaged, each of said packaging devices being independent of every other packaging device and each comprising a bag-former and a weighing mechanism rotative together, said weighing mechanism having a material-receiving vessel or pan movable toward said bag-former when loaded and said bag-former being movable into and out of position to receive the material from said vessel or pan, means for causing properly-timed movements of the several parts and means for causing the discharge of the material from said vessel or pan into the bag on said former.

19. In a packaging-machine, the combination of traveling packaging devices and means by which the same are supplied with material to be packaged, said packaging devices comprising bag-carriers, means for supplying a regulated quantity of material to the bags on said carriers, means for causing said carriers and their respective supplying means to travel together, means for moving the bag-carriers inward and outward, in a radial direction, and means for causing the discharge of said regulated quantity of material into the bags on said carriers from their respective supplying means when the bag-carriers are in one position of their inward or outward movement.

20. In an automatic weighing-machine, the combination with a traveling carrier, of a series of weighing mechanisms mounted thereon and each having a receiving vessel, a series of feeders for said vessels arranged along the path of movement thereof and having graduated delivery capacities, and means operable in the travel of the carrier to effect discharge from one or more of said feeders.

21. In an automatic weighing-machine the combination of a carrier, weighing mechanism thereon, feed mechanism relative to said carrier, said mechanism including a stationary hopper having a plurality of discharge-outlets in its bottom, closures controlling the discharge from said outlets, and means operated by the traveling weighing mechanism to control automatically said closures.

Signed at Philadelphia, Pennsylvania, this 27th day of March, 1901.

ADELBERT H. PHILLIPS.

Witnesses:
RUPERT G. RAEZER,
LAURA V. WHITCOMB.